(12) United States Patent
Zai et al.

(10) Patent No.: US 8,817,927 B2
(45) Date of Patent: Aug. 26, 2014

(54) ADAPTIVE INTERFERENCE CANCELLER IN A DIGITAL PHASE ARRAY

(71) Applicant: The Johns Hopkins University, Baltimore, MD (US)

(72) Inventors: Andrew W. Zai, Fairfax, VA (US); Cesar A. Lugo, Rockville, MD (US); Matthew D. Sharp, Elkridge, MD (US); Minhtri T. Ho, Rockville, MD (US)

(73) Assignee: The Johns Hopkins University, Baltimore, MD (US)

( * ) Notice: Subject to any disclaimer, the term of this patent is extended or adjusted under 35 U.S.C. 154(b) by 77 days.

(21) Appl. No.: 13/655,544

(22) Filed: Oct. 19, 2012

(65) Prior Publication Data

US 2013/0101073 A1    Apr. 25, 2013

Related U.S. Application Data

(60) Provisional application No. 61/549,786, filed on Oct. 21, 2011.

(51) Int. Cl.
| | |
|---|---|
| *H04B 1/10* | (2006.01) |
| *G01S 7/28* | (2006.01) |
| *G01S 7/36* | (2006.01) |
| *G01S 7/02* | (2006.01) |

(52) U.S. Cl.
CPC ............. *G01S 7/023* (2013.01); *G01S 7/2813* (2013.01); *G01S 7/36* (2013.01)
USPC ........................................................ 375/349

(58) Field of Classification Search
CPC ......... H04B 1/123; H04B 7/0408; H04L 1/06
USPC .................. 375/349, 267; 342/146, 372, 442; 455/452.2, 562.1
See application file for complete search history.

(56) References Cited

U.S. PATENT DOCUMENTS

| | | |
|---|---|---|
| 5,412,391 A | 5/1995 | Lewis |
| 5,440,308 A | 8/1995 | Dybdal et al. |
| 5,818,517 A | 10/1998 | Hudson et al. |
| 7,714,782 B2 | 5/2010 | Davis et al. |

(Continued)

FOREIGN PATENT DOCUMENTS

WO    2012042256    4/2012

OTHER PUBLICATIONS

Sanval et al., "Mainlobe Canceller with Motion Compensation for Use with Radar Systems", Reg. No. H792, Published Jun. 5, 1990, pp. 1-12.

*Primary Examiner* — Khai Tran
(74) *Attorney, Agent, or Firm* — Aisha Ahmad

(57) ABSTRACT

A digital phased array may include a plurality of antenna elements forming a main array of the digital phased array, a plurality of mixers configured to down-convert data received at respective ones of the antenna elements, a plurality of analog-to-digital converters configured to digitize data provided by corresponding ones of the mixers, and a digital signal processor. The digital signal processor may be configured to receive digitized data including at least one interference signal and at least one desired signal, determine an angle of arrival of the at least one interference signal, steer a beam of the main array toward the at least one interference signal based on the determined angle of arrival, and perform interference cancellation relative to the at least one interference signal.

20 Claims, 5 Drawing Sheets

(56) References Cited

U.S. PATENT DOCUMENTS

| | | |
|---|---|---|
| 8,005,238 B2 | 8/2011 | Tashev et al. |
| 2005/0030228 A1* | 2/2005 | Judd .............................. 342/383 |
| 2010/0134343 A1* | 6/2010 | Nakagawa .................... 342/147 |
| 2012/0086602 A1* | 4/2012 | Park et al. ..................... 342/372 |
| 2013/0069818 A1* | 3/2013 | Shirakawa et al. ........... 342/146 |

* cited by examiner

ADAPTIVE INTERFERENCE CANCELLER IN A DIGITAL PHASE ARRAY

CROSS-REFERENCE TO RELATED APPLICATIONS

This application claims the benefit of U.S. Provisional Application No. 61/549,786 filed on Oct. 21, 2011, the entire contents of which are hereby incorporated herein by reference.

TECHNICAL FIELD

Exemplary embodiments of the present disclosure generally relate to interference cancellation in a digital phase array, and more specifically relate to employment of a steered auxiliary beam canceller (SABC) algorithm in connection with employing adaptive interference cancellation in a digital phased array.

BACKGROUND

A digital phased array includes a plurality of antennas formed into an array. The phased array works by forming abeam with an array of antenna elements in a certain direction, thus causing a high gain relative to a signal of interest. The signal of interest could be a desired signal originating from a target for which tracking using the phased array is desired or an interference signal. In some cases, the interference signal may be intentionally provided in the form of a jamming signal. Thus, one challenge associated with operation of a digital phased array is to accurately preserve a signal coming from a target, white minimizing the effects of interfering signals coming from other directions.

Conventional digital phased arrays may employ a signal processor to facilitate cancellation of interference signals. Two relatively well known solutions for interference cancellation include a Side-Lobe Canceller (SLC) and the Linearly Constrained Minimum Variance (LCMV) beamformer. SLC employs a low gain auxiliary channel with a near uniform gain pattern over the steerable range of the main beam. With this configuration, any interference in the side lobe of the main beam can be subtracted out of the desirable signal in the main beam using the information in the auxiliary channel. Of course, the signal of interest wilt also be present in the auxiliary channel and some signal loss will occur when subtracting from the main beam. However, the loss is generally expected to be relatively small because the gain in the main beam is much larger than the gain of the auxiliary channel.

In contrast to SLC, LCMV beamformer is a method for calculating the beamforming weights of an array. In conventional beamforming, the typical weights are just those that will introduce a progressive time delay to each unit such that the array is steered in a certain direction. LCMV adaptively computes weights that will steer the array in the desired direction, but also have nulls in the directions of interference while minimizing main beam losses. Thus, LCMV achieves the same objective as SLC with respect to interference removal. However, LCMV also minimizes loss to the signal of interest.

Both SLC and LCMV were introduced decades ago. However, SLC has remained the dominant algorithm employed in large systems having hundreds of elements due to the computational cost associated with LCMV. While SLC may be more practical for implementation, SLC does not necessarily perform as well as LCMV due to the fact that SLC causes signal loss and has difficulty performing for main-beam interference. Computing hardware is much more mature today, and thus it may be more practical to implement LCMV than it had been in the past. However, LCMV still presents significant computational challenges for signals with a wide bandwidth and when the array has a large number of elements. Thus, it may be desirable to develop an algorithm that can perform interference cancellation while avoiding some of the performance degradations described above.

BRIEF SUMMARY OF SOME EXAMPLES

Accordingly, some example embodiments may enable the provision of an adaptive interference algorithm with improved performance. In this regard, some embodiments may provide enablement for employment of a steered auxiliary beam canceller (SABC) algorithm. Example embodiments may therefore provide an array structure and signal processing equipment capable of employing the SABC algorithm. The SABC algorithm of an example embodiment may be used to configure signal processing circuitry to provide improved performance relative to SIX while remaining computationally simpler than LCMV.

In one example embodiment, a digital phased array is provided. The digital phased array may include a plurality of antenna elements forming a main array of the digital phased array, a plurality of mixers configured to down-convert data received at respective ones of the antenna elements, a plurality of analog-to-digital converters configured to digitize data provided by corresponding ones of the mixers, and a digital signal processor. The digital signal processor may be configured to receive digitized data including at least one interference signal and at least one desired signal, determine an angle of arrival of the at least one interference signal, steer a beam of the main array toward the at least one interference signal based on the determined angle of arrival, and perform interference cancellation relative to the at least one interference signal.

In another example embodiment, a method of performing interference cancellation is provided. The method may include receiving digitized data including at least one interference signal and at least one desired signal from a plurality of antenna elements forming a main array of a digital phased array where the digitized data is down-converted and digitized prior to provision to a digital signal processor. The method may further include utilizing the digital signal processor to determine an angle of arrival of the at least one interference signal, steer a beam of the main array toward the at least one interference signal based on the determined angle of arrival, and perform interference cancellation relative to the at least one interference signal.

In another example embodiment, a computer program product comprising a computer-readable storage medium having computer-executable program code instructions stored therein is provided. The computer-executable program code instructions may include program code instructions for receiving digitized data including at least one interference signal and at least one desired signal from a plurality of antenna elements forming a main array of a digital phased array where the digitized data is down-converted and digitized prior to provision to a digital signal processor. The method may further include utilizing the digital signal processor to determine an angle of arrival of the at least one interference signal, steer a beam of the main array toward the at least one interference signal based on the determined angle of arrival, and perform interference cancellation relative to the at least one interference signal.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
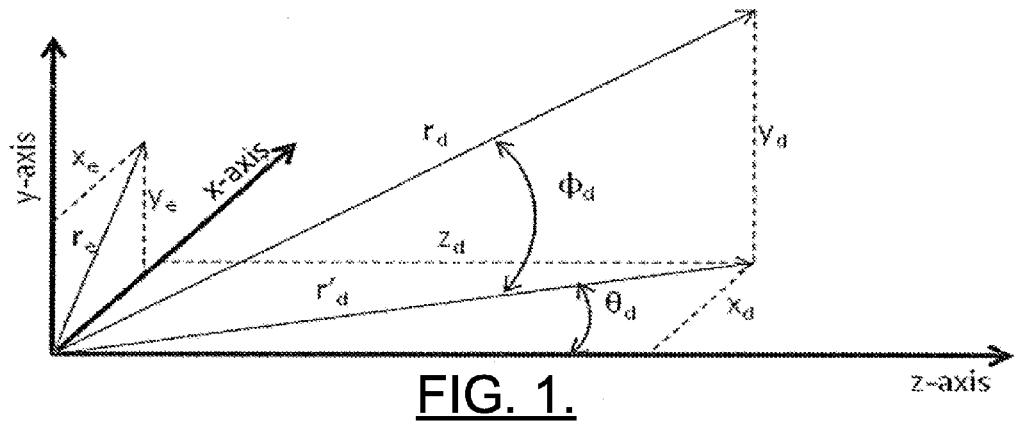
FIG. 1 illustrates a schematic for defining desired signal vectors and element vectors associated with determining a desired signal source position in terms of its range, azimuth, and elevation by the symbols $|r_d|$, $\theta_d$, and $\phi_d$, respectively, according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some example embodiments may enable the provision of an adaptive interference algorithm with improved performance. In this regard, some embodiments may provide enablement for employment of a steered auxiliary beam canceller (SABC) algorithm. Example embodiments may therefore provide an array structure and signal processing equipment capable of employing the SABC algorithm. The SABC algorithm of an example embodiment may be used to configure signal processing circuitry to provide improved performance relative to SLC while remaining computationally simpler than LCMV.

FIG. 1 illustrates a schematic for defining desired signal vectors and element vectors associated with determining a desired signal source position in terms of its range, azimuth, and elevation by the symbols $|r_d|$, $\theta_d$, and $\phi_d$, respectively. With respect to a stationary planar phased array, the elements of the array are restricted to the X-Y plane; therefore, any element in the array will have a displacement vector $r_e = x_e\hat{i} + y_e\hat{j} + 0\hat{k}$, where $\hat{i}, \hat{j}$, and $\hat{k}$ are unit vectors in the x, y and z directions, respectively, and the center of the array is located at the origin. Solving for the x, y and z positions of a source signal may be accomplished via the following:

$$|r_d'| = |r_d|\cos(\phi_d)$$

$$x = |r_d'|\sin(\theta_d) = |r_d|\cos(\phi_d)\sin(\theta_d)$$

$$y_d = |r_d|\sin(\phi_d)$$

$$z_d = |r_d'|\cos(\theta_d) = |r_d|\cos(\phi_d)\cos(\theta_d)$$

Therefore, a desired signal source will have a displacement vector $r_d = x_d\hat{i} + y_d\hat{j} + z_d\hat{k}$.

Figure 2:
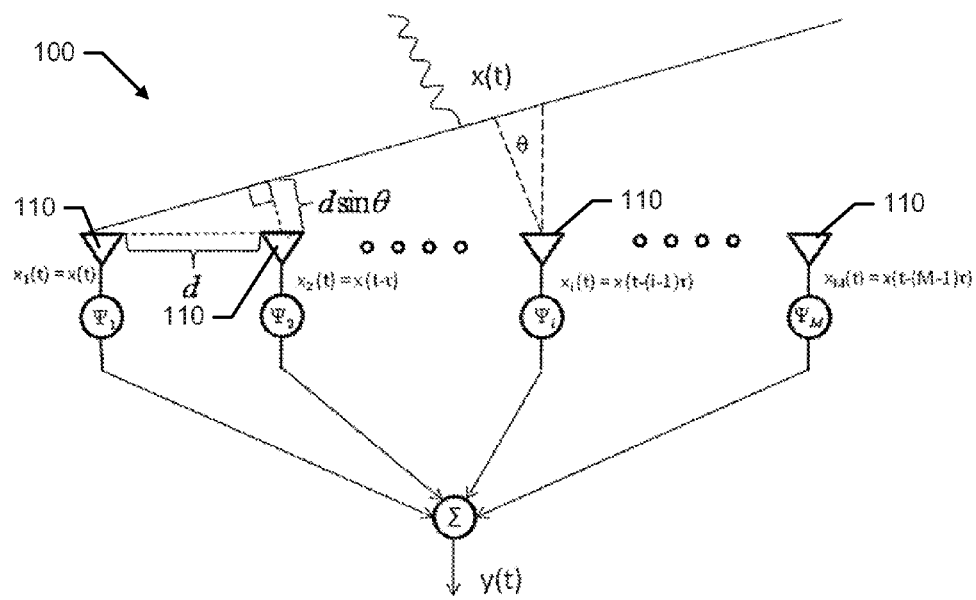
FIG. 2 illustrates a uniformly spaced linear array in which each of the elements thereof has a uniform distance therebetween according to an example embodiment.

The process of forming beams in the direction of the desired signal source may be divided into two cases, namely narrow-band and wide-band cases, dependent upon the bandwidth of the signal. FIG. 2 illustrates a uniformly spaced, M-element, linear array 100. Each of the M elements 110 may have a uniform distance, d, between them. The signal x(t) may arrive at an azimuth of $\theta$ relative to the boresight of the array 100. The symbol, $\Psi$, represents the phase shift applied to each element. The source signal in FIG. 2 is assumed to be at a zero elevation and far enough away that the rays of the signal approach as a plane wave. Since the elements are equally spaced by the distance, d, there is a progressive time delay on x(t) received in each element. The time delay in the ith element can be represented by $x_i(t) = x_i(t - (i-1)\tau)$, where $\tau = d/c \sin(\theta)$ and c is the speed that the signal travels, or the speed of light in free space electromagnetic applications. The signals in the elements may be modeled as shown below.

$$x_1(t) = e^{j2\pi f_0 t}$$

$$x_i(t) = x_1(t - (i-1)\tau)$$
$$= e^{j2\pi f_0 (t-(i-1)\tau)}$$
$$= x_1(t)e^{-j2\pi f_0 (i-1)\tau}$$

As can be seen from the result above, the $i^{th}$ element manifests itself as a phase shift shown below $$\Psi_i(t) = e^{-j2\pi f_0 (i-1)\tau}$$

An array can take advantage of the fact that the signal received at each element is a delayed version of the signal of interest to coherently add them and increase the signal-to-noise ratio. As shown in the equation below, an array output, y(t), may be solved to increase the received signal voltage by a factor of M when each element is multiplied by the complex conjugate of its phase delay.

$$y(t) = \sum_{i=1}^{M} x_i(t - (i-1)\tau) * e^{j2\pi f_0 (i-1)\tau}$$
$$= \sum_{i=1}^{M} x(t)e^{-j2\pi f_0 (i-1)\tau} e^{j2\pi f_0 (i-1)\tau}$$
$$= Mx(t)$$

Fixed beamforming may result from the equation above, because the array is forming an antenna pattern that is focused in the direction of $\theta_0$. The gain of the array will be highest for a signal coming from a direction of $\theta_0$ because the inner product of the steering vector and weight vector's conjugate will be M and results in an M-times gain of the signal. The gain of a signal from any direction may be solved by taking this inner product using that signal's steering vector. The pattern for these gains takes the shape of a sine function known as the array factor. The equation below may be used for calculation of the array factor of a narrowband array where λ0 is the wavelength of the carrier wave.

$$AF(\theta) = \frac{\sin\left[M\pi\frac{d}{\lambda_0}(\sin\theta - \sin\theta_0)\right]}{M\sin\left[\pi\frac{d}{\lambda_0}(\sin\theta - \sin\theta_0)\right]}$$

Up to this point, it has been assumed that the signal was narrow-band, meaning that it consisted of only one frequency, and had infinite duration. These assumptions may be relaxed to include a signal with a small bandwidth relative to the carrier frequency and a long duration relative to the size of the array. Once such assumptions are no longer valid, it is not possible to imitate the delay using a phase shift. Instead, the elements that receive the signal first must have their responses delayed to line up with elements that receive the signal later. Current systems implement this time delay using analog delay lines. This may work reasonably well, but tends to take up a lot of space and is costly while only allowing for a finite number of predesigned steering angles. In digital arrays, the appropriate delay can be synthesized digitally at each element with high resolution.

Figure 3:
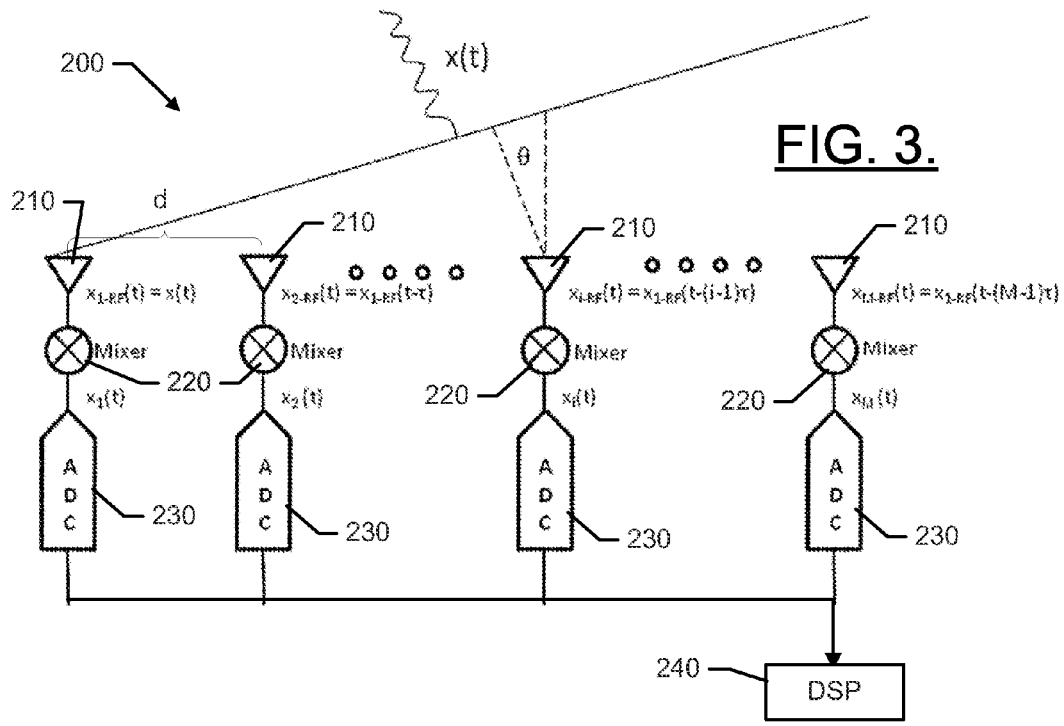
FIG. 3 illustrates an arrangement for a digital uniform linear array according to an example embodiment.

FIG. 3 illustrates an arrangement for a digital uniform linear array according to an example embodiment. The array 200 of FIG. 3 may include a plurality of elements 210 (e.g., M elements) with a uniform distance, d, therebetween. A signal, x(t), may be arriving from an azimuth of θ. The signal received by each of the elements 210 may be down-converted by a mixer 220 and sampled by an analog-to-digital converter (ADC) 230. Thereafter, a digital signal processor (DSP) 240 may be employed to process the down-converted and sampled versions of the signal to employ any of the processing techniques described herein.

Each element of the array 200 may receive a wide-band signal at a radio frequency. These signals may be down-converted (e.g., via the mixer 220) to baseband frequencies so that the ADCs 230 can employ a lower sampling rate. Once the signals of each element 210 have been digitized, the DSP 240 may implement the delays required for beamforming. In order to understand how to delay the $i^{th}$ signal. It may again be compared to various signal in the array 200. For example, the signal received by the first element may be:

$$x_1(t) = x_{1-RF}(t)e^{-j2\pi f_{RF}t}$$
$$= x(t)e^{j2\pi f_{RF}t}e^{-j2\pi f_{RF}t}$$
$$= x(t)$$

and the signal received by $i^{th}$ element may be:

$$x_i(t) = x_{i-RF}(t - (i-1)\tau)e^{-j2\pi f_{RF}t}$$
$$= x(t - (i-1)\tau)e^{j2\pi f_{RF}(t-(i-1)\tau)}e^{-j2\pi f_{RF}t}$$
$$= x(t - (i-1)\tau)e^{-j2\pi f_{RF}(i-1)\tau}$$

These signals may be analyzed in the frequency domain to understand how to implement the $$X_1(f) = F\{x(t)\}$$
$$= X(f)$$

$$X_i(f) = F\{x_i(t)\}$$
$$= F\{x_1(t-(i-1)\tau)e^{-j2\pi f_{RF}(i-1)\tau}\}$$
$$= X(f)e^{-j2\pi f(i-1)\tau}e^{-j2\pi f_{RF}(i-1)\tau}$$
$$= X(f)e^{-j2\pi f(f+f_{RF})(i-1)\tau}$$

As can be appreciated from the equations above, the results of the immediately preceding equations are the same with a frequency dependent phase shift. If narrowband assumptions are no longer valid, one must find a way to simulate the frequency dependent multiplication of the immediately preceding equation.

The time delay modeled for $x_i(t)$ above can be implemented using frequency domain processing. This processing may require that the ADCs 230 save the information for a period of time and perform batch processing on the data. In an example embodiment, the ADCs' 230 sample rate may be $f_s$ Hz and they may save K samples $T_s$ seconds apart. Once the K samples are saved into a [K×1] vector, a Fourier Transform may be performed on it and it may be multiplied by the appropriate frequency dependent complex weights as shown below:

$$x_i = \begin{bmatrix} x_i(t-(K-1)T_s) \\ \vdots \\ x_i(t-T_s) \\ x_i(t) \end{bmatrix}$$

$$x_{i-delayed} = F^{-1}\left\{\begin{bmatrix} X_i(0) \\ X_i\left(\frac{f_s}{K}\right) \\ X_i\left(\frac{2f_s}{K}\right) \\ \vdots \\ X_i\left(\frac{f_s}{2}\right) \\ X_i\left(-\frac{f_s}{2}+\frac{f_s}{K}\right) \\ \vdots \\ X_i\left(\frac{-f_s}{K}\right) \end{bmatrix} \odot \begin{bmatrix} e^{-j2\pi(0+f_{RF})(i-1)\tau} \\ e^{-j2\pi\left(\frac{f_s}{K}+f_{RF}\right)(i-1)\tau} \\ e^{-j2\pi\left(\frac{2f_s}{K}+f_{RF}\right)(i-1)\tau} \\ \vdots \\ e^{-j2\pi\left(\frac{f_s}{2}+f_{RF}\right)(i-1)\tau} \\ e^{-j2\pi\left(-\frac{f_s}{2}+\frac{f_s}{2}+f_{RF}\right)(i-1)\tau} \\ \vdots \\ e^{-j2\pi\left(-\frac{f_s}{K}+f_{RF}\right)(i-1)\tau} \end{bmatrix}\right\}$$

where $X_i(k)$ is the $k^{th}$ frequency component of the Fourier transform of vector xi–t and ⊙ is the operator for the element wise vector multiplication. This operation can be done on M−1 elements so that they all have the same delay as the $M^{th}$ element. From there, they may all be added together to form a beam in the direction corresponding to the delay. One thing to note is that a wideband array does not remove the delay of the last element by shifting it forward; instead, it delays the first elements to receive the signal until they are even in time with the last element. This is done because it is a causal system and cannot operate on future signal values.

The preceding descriptions assume that the array employed is a linear array in which all of the elements lie on the x-axis. However, the concepts above can also be extended to a planar array with all elements lying in an x-y plane. In a planar array, the delay will be a function of the distance between two elements along the x-axis and y-axis. To be exact, $\tau=\Delta r \sin(\theta)\cos(\phi)+\Delta y \sin(\phi)$, with $\Delta x$ and $\Delta y$ being the spacing between two adjacent elements relative to receipt of the signal in the x-dimension and y-dimension, respectively.

Adaptive interference cancellation may be employed by the DSP 240 according to a selected algorithm. In adaptive beam forming, one is typically interested in maximizing a signal from a certain direction while minimizing the effects of interference from other angles. LCMV is one mechanism that could be employed for adaptive beam forming. LCMV attempts to employ an improved weighting to be applied to the elements of the array. LCMV is typically found by minimizing the variance of an output signal to correspondingly minimize the noise power subject to constraints that are imposed on the optimization. Thus, LCMV can be solved by finding the weights that minimize an output variance subject to constraints chosen by the designer. Thus, LCMV requires the use of a digital array with the goal of solving an adaptive weight for each element such that interference is minimized. However, as mentioned above, the costs of LCMV are quite high.

SLC takes a different approach with the goal of saving on computational costs, but sacrificing performance. SLC does not always require a digital array. For an SLC, one only needs to digitize the main beam and auxiliary channels so that fewer channels are required to be processed. However, since the SLC requires auxiliary channels, the architecture of SLC requires the existence of main array elements and auxiliary channels that can be weighted and subtracted from the main beam. The elements of the main array are weighted with fixed weights to form beams in a direction of interest. The auxiliary channels are each composed of only one element and thus have a much lower gain than the main beam. Each auxiliary element is weighted with an adaptive weight and then subtracted out of the main beam to form an error signal. The goal of the SLC is to solve the weights that minimize the error signal. The error is the difference between the main beam and the weighted auxiliary channels. If it happens that there is an interfering signal in both the main beam and the auxiliary channels, minimizing error will effectively subtract the interference out of the main beam.

Implementation of wideband adaptive interference cancellation may be accomplished using sub-bands or temporal taps for each channel. Thus, for example, fixed and adaptive beamforming may be accomplished, and both wideband and narrowband beamforming may be accomplished. While LCMV and SLC can be employed in either narrowband or wideband situations, the use of time delay units or sub-bands may be required to deal with wideband scenarios. However, the balance between computational burden, which is quite high for LCMV, and performance limitations, which are more severe for SLC may not be optimal for all situations. Thus, some example embodiments may employ an algorithm that includes better performance without imposing severe computational burdens in an example embodiment, improved performance may be achieved by configuring the DSP 240 to employ a steered auxiliary beam cancellation (SABC) technique as described herein. The SABC technique may improve the performance of SLC without a large increase in computational cost.

By employing SLC, the signal of interest experiences some loss because a part of the signal is present in the auxiliary channel. The amount of the signal is actually proportional to the gain of the auxiliary channel in the direction of the signal of interest. For simplicity, the auxiliary channel may be assumed to be isotropic. This may therefore cause a higher distortion on the signal of interest when the interference appeared in a higher side lobe.

SABC may generally employ SLC architecture, except that a formed beam from the main array is used instead of an isotropic auxiliary channel. SABC produces a smaller correlation between the auxiliary channel and the main channel. This is shown graphically FIG. 4, which shows that when an auxiliary channel is adapted to the proper level, there is a high amount of the signal of interest's energy that gets removed for SLC. However, much less signal of interest is lost if another beam is formed on the interference. This is because the signal of interest now falls in the side lobe of the auxiliary beam.

Figure 4:
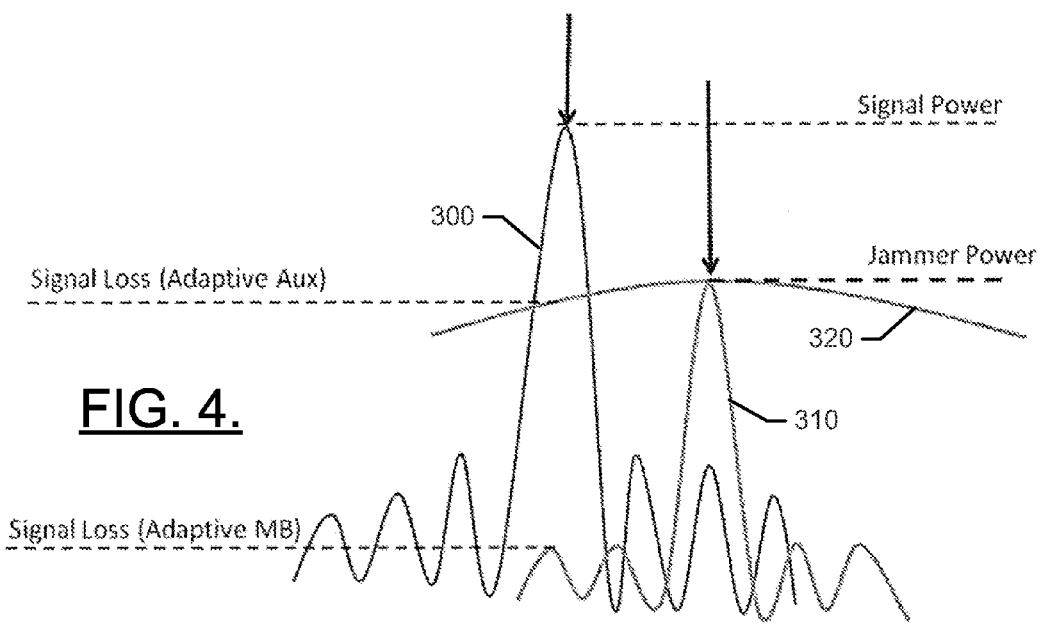
FIG. 4 illustrates a graphical representation of SLC and SABC according to an example embodiment.

FIG. 4 illustrates a graphical representation of SLC and SABC. In FIG. 4, curve 300 represents the main channel, curve 310 represents the auxiliary channel, and curve 320 represents the steered auxiliary beam. The implication of this technique is that the angle of the interference must be known so that a beam may be steered towards it. Array processing methods such as MUSIC and ESPRIT (Estimation of Signal Parameters via Rotational Invariance Techniques can estimate the angle of arrival of several simultaneous signals using a digital array. In some embodiments, for computational reasons, ESPRIT may be used. One reason ESPRIT is computationally efficient is that one only needs to process as many elements as there are sources of interference. This means that in a 100 element array having less than 10 sources of interference, only 10 elements would need to be processed by ESPRIT.

In some embodiments, SABC may be characterized in terms of losses in the signal of interest. The output of SABC according to one example implementation is shown below where $G_B$ is the gain of a beam and $L_{SL}$, is the loss of the side lobe in which the Interference appears relative to the boresight gain.

$$s_{out}(t)=G_B s(t)=G_B L_{SL} s(t) w^* \tag{1}$$

The weight used above is also shown in (2) below.

$$w = \frac{E[G_B L_{SL} j(t)^* G_B j(t)]}{E[G_B j(t)^* G_B j(t)]} = L_{SL} \tag{2}$$

If (2) is substituted into (1), the final output of SABC is obtained.

$$s_{out}(t)=G_B s(t)(1-L_{SL}^2) \tag{3}$$

To determine the improvement gained over the standard SLC, the following may be determined:

$$SABC \text{ Gain} = \frac{G_B s(t)(1-L_{SL}^2)}{G_B s(t)(1-L_{SL})} = \frac{(1-L_{SL}^2)}{(1-L_{SL})} \tag{4}$$

Figure 5:
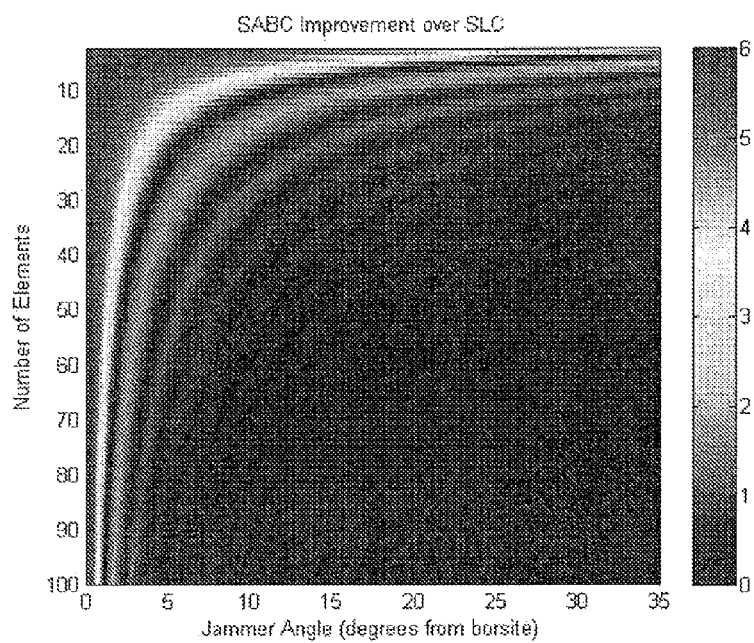
FIG. 5 shows the gain of SABC over SLC for a linear array with a range of elements according to an example embodiment.

The gain in (4) may be dependent on the angle of arrival of the interference, the angle of arrival of the signal of interest, and the number of elements in the array, FIG. 5 shows the gain of SABC over SLC for a linear array with a range of elements. In this regard, FIG. 5 shows the gain of SABC over SLC, in decibels, as the source of interference is moved away from the signal of interest.

FIG. 5 assumes the signal of interest is at zero degrees and that only one source of interference is present. Analysis of FIG. 5 can shed some insights into the benefits of SABC. First of all, the gain of SABC is never less than zero meaning it always performs at least as well as SLC. Additionally, there are several areas of FIG. 5 where SABC shows a gain of about 2 dB, particularly in the peaks of the first two side lobes, which is a significant increase. However the greatest gain occurs when the interference is located in the main beam where an increase of 4 to 6 dB is experienced. This should be of no surprise since SLC is designed for side lobe interference as its name suggests, but this does show that SABC is capable of dealing with interference in the main beam of the array. SABC also causes distortion on the signal of interest with main beam interference; however, it turns out that LCMV encounters this problem too and SABC performs as well in these situations.

$$y(t) = \left(MA_s s(t) + ML_{SL}A_j j(t) + \sum_{i=1}^{M} A_n n_i(t) e^{j2\pi \frac{d}{c} \sin\theta_i (i-1)}\right) - \qquad (7)$$

$$w^* \left(ML_{SL}A_s s(t) + MA_j j(t) + \sum_{i=1}^{M} A_n n_i(t) e^{j2\pi \frac{d}{c} \sin\theta_j (i-1)}\right)$$

The equation to solve for the weights for the steered aux beam is:

$$w = \frac{E\left[\left(ML_{SL}A_j j(t) + \sum_{i=1}^{M} A_n n_i(t) e^{j2\pi \frac{d}{c} \sin\theta_s (i-1)}\right)^* \left(MA_j j(t) + \sum_{i=1}^{M} A_n n_i(t) e^{j2\pi \frac{d}{c} \sin\theta_j (i-1)}\right)\right]}{E\left[\left(MA_j j(t) + \sum_{i=1}^{M} A_n n_i(t) e^{j2\pi \frac{d}{c} \sin\theta_j (i-1)}\right)\left(MA_j j(t) + \sum_{i=1}^{M} A_n n_i(t) e^{j2\pi \frac{d}{c} \sin\theta_j (i-1)}\right)^*\right]} \qquad (8)$$

$$= \frac{L_{SL} M^2 A_j^2 E[j(t) j(t)^*] + \sum_{i=1}^{M} E[A_n^2 n_i(t) n_i(t)^*]}{M^2 A_j^2 E[j(t) j(t)^*] + \sum_{i=1}^{M} E[A_n^2 n_i(t) n_i(t)^*]} \simeq L_{SL}$$

Equation (4) was derived assuming that the weights were saved such that the interference source was perfectly removed from the main beam. From this it can be shown that SABC performs better than SLC because it distorts the signal less. However, the correlation matrices must be known in order to compute the weights that perfectly cancel the interference. These will never be known and must be estimated in the presence of noise. For this reason SABC presents another gain over the performance of SLC that turns out to be much more substantial than the ideal gain.

Consider equation (5) below, which considers the presence of noise in the channels.

$$y(t) = b(t) - w^* \tilde{x}_1(t) \qquad (5)$$

$$y(t) = \left(G_B A_s s(t) + G_B L_{SL} A_j j(t) + \sum_{i=1}^{G_s} A_n n_i(t) e^{j2\pi \frac{d}{c} \sin\theta_s (i-1)}\right) -$$

$$w^*(A_s s(t) + A_j j(t) + A_n n_{\bar{1}}(t))$$

In this equation, $G_B$ is the gain of the main beam and is equal to the number of elements, M, $L_{SL}$, is the loss of the side lobe the interference happens to fall in, and $n_i(t)$ the noise in the auxiliary channel if one assumes there is a training region where the signal is not present, the solution for the weights is:

$$w = \frac{E\left[\left(ML_{SL}A_j j(t) + \sum_{i=1}^{M} A_n n_i(t) e^{j2\pi \frac{d}{c} \sin\theta_i (i-1)}\right)^* (A_j j(t) + A_n n_{\bar{1}}(t))\right]}{E[(A_j j(t) + A_n n_{\bar{1}}(t))(A_j j(t) + A_n n_{\bar{1}}(t))^*]} \qquad (6)$$

$$= \frac{M L_{SL} A_j^2 E[j(t) j(t)^*] + A_n^2 E[n_{\bar{1}}(t) n_{\bar{1}}(t)^*]}{A_j^2 E[j(t) j(t)^*] + A_n^2 E[n_{\bar{1}}(t) n_{\bar{1}}(t)^*]} \neq M L_{SL}$$

It may be appreciated that the weight estimate becomes corrupted in the presence of noise. SABC may not be immune to this phenomenon, but the impact is far less severe than for other adaptive interference cancellation techniques. Equation (5) can be re-written for SABC as follows:

Upon comparison of (6) and (8), one can see that both are corrupted by unwanted noise; however, the contribution of interference grows on the order of M squared whereas the noise only grows on the order of M in (6). This means that the larger M is for the weight estimation, the closer it is to the ideal weight of (2). Equation (6) does not enjoy any such improvement and the interference and noise contribute equally to the result.

In an example embodiment, the gains in the presence of noise should not be overlooked because they cause the interference cancellation ratio (ICR) of SABC to be significantly higher than SLC. Unlike LCMV and SLC, SABC only has one method to solve the wideband problem which is by subbanding the beams. There are two reasons why the time-delay unit approach may not work for SABC. First of all, the method used to determine the interference angles, ESPRIT, only works for narrowband signals; therefore, it is convenient to do this step on sub-banded data. This shortcoming may be overcome if other wideband angle of arrival estimators are found and happen to be computationally efficient. The second problem with the time-delay unit approach is that beamforming on the interference sources de-correlates them from the interference in the main beam. SLC only works because the interference in the auxiliary channels are correlated and may be weighted and subtracted out; thus, the time-delay unit SABC approach will not work because this necessity is violated.

Figure 6:
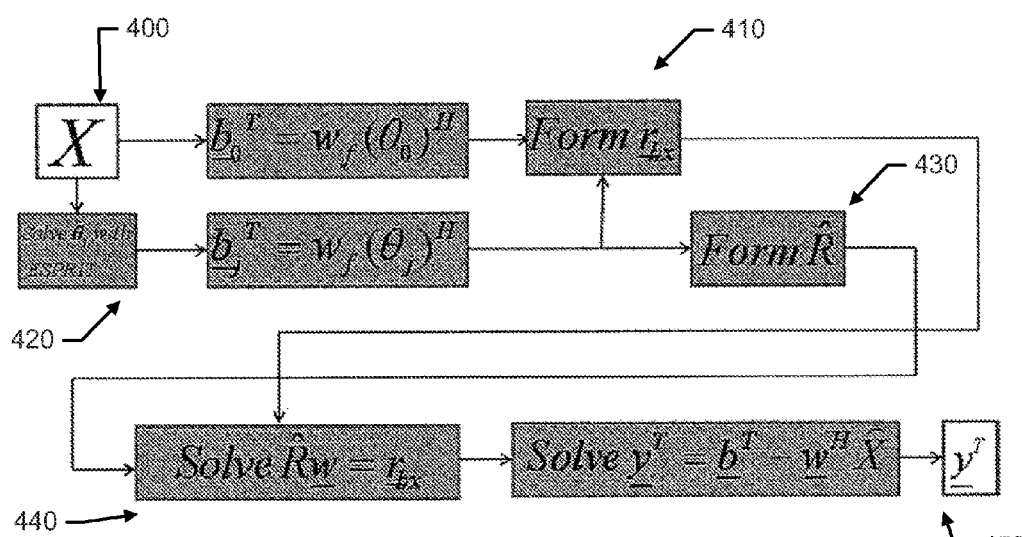
FIG. 6 illustrates a block diagram showing processing steps associated with performing SABC according to an example embodiment.

The computational cost of SABC is similar to that of SLC because the techniques are so similar. The primary difference between the two is the step used in SABC to determine the angles of the interference sources and forming beams on them. FIG. 6 illustrates a block diagram showing processing steps associated with performing SABC according to an example embodiment. As shown in FIG. 6, the SABC may begin by taking a data matrix, X, at operation 400. At operation 410, a cross covariance vector, $r_{bx}$, is formed. Meanwhile, at operation 420, interference angles are determined and an auxiliary beam (e.g., one beam in the digital array) is steered to the determined interference angles for each interference signal. The covariance matrix is then estimated via normalization of the outer product of X by the number of samples at operation 430. A solution for weights to apply to the estimated covariance matrix to match the cross covariance vector may then be determined at operation 440 and the output of the canceller may then be determined at operation 450.

Tables 1 and 2 below show the computational cost for narrowband SABC and wideband SABC, respectively. In these tables, the variables J and M represent the number of interference sources and the number of elements used in the ESPRIT algorithm, respectively.

TABLE 1

| | |
|---|---|
| ESPRIT on $\overline{X}$ for $\theta_i$ | $12\overline{M}^2 - \overline{M}^2 + 3\overline{M}K + 4\overline{M}^2 J + 8/3 J^3 + 11J^3 + 3J - \overline{M}J$ |
| $\underline{b}_i^T = \underline{w}_{fi}^H \overline{X}$ for $i = 1: (J + 1)$ | $(J + 1)(2MK - K)$ |
| SLC with main beam and aux beams | $1/3 J^3 + 1/2 J^2 + 2J^2 K + 5JK + K - 5/6 J$ |
| Total | $12\overline{M}^3 + 1/3 J^3 + 2J^2 K + 1/2 J^2 - \overline{M}^2 + 5JK + 3\overline{M}K + 4\overline{M}^3 J + 2/3 J^3 \ldots +$ |
| | $11J^2 + 3J - \overline{M}J + K - 5/6 J + 2JMK - JK + 2MK - K$ |

TABLE 2

| | |
|---|---|
| ESPRIT on $\overline{X}$ for $\theta_i$ | $N(12\overline{M}^2 - \overline{M}^2 + 3\overline{M}K + 4\overline{M}^2 J + 8/3 J^3 + 11J^3 + 3J - \overline{M}J)$ |
| $\underline{b}_i^T = \underline{w}_{fi}^H \overline{X}$ for $i = 1: (J + 1)$ | $N(J + 1)(2MK - K)$ |
| SLC with main beam and aux beams | $N(1/3 J^3 + 1/2 J^2 + 2J^2 K + 5JK + K - 5/6 J) + K(N - 1)$ |
| Total | $N(12\overline{M}^3 + 1/3 J^3 + 2J^2 K + 1/2 J^2 - \overline{M}^2 + 5JK + 3\overline{M}K + 4\overline{M}^3 J + 2/3 J^3 \ldots +$ |
| | $11J^2 + 3J - \overline{M}J + K - 5/6 J + 2JMK - JK + 2MK - K) + K(N - 1)$ |

Figure 7:
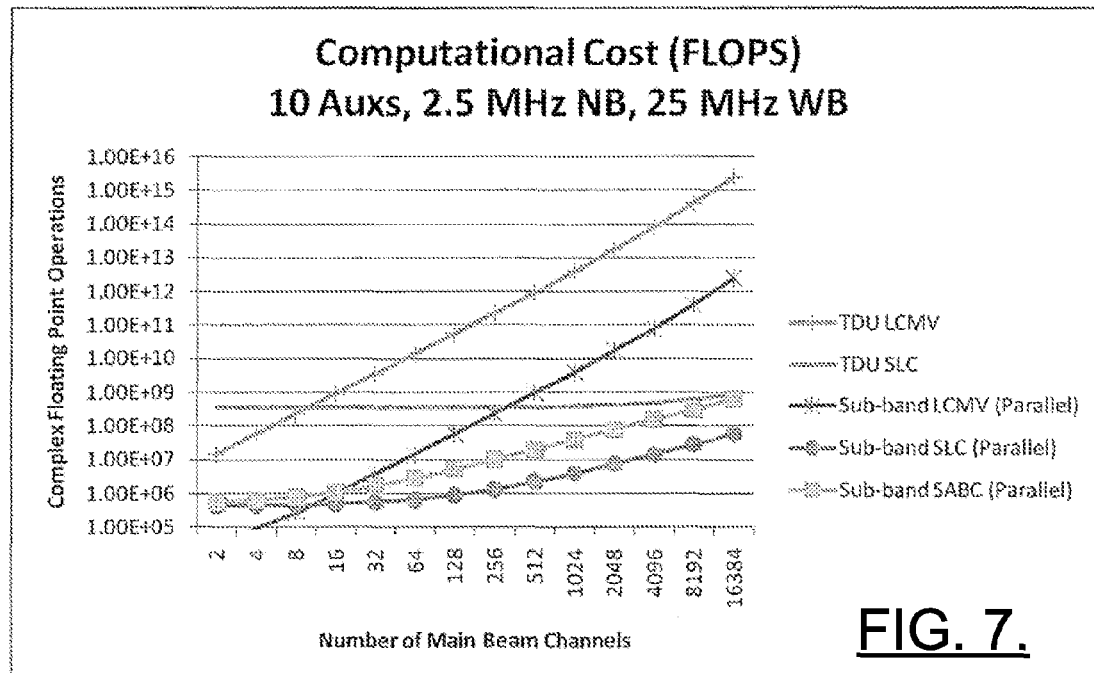
FIG. 7 is a graph showing computational costs of SABC compared to those of LOW and SLC according to an example embodiment.

The computational costs of SABC may be compared to those of LCMV and SLC as shown in FIG. 7. In this figure only the wideband case is considered since it is the most demanding computationally. This figure shows that for the case under consideration, SABC is always more efficient than TDU LCMV and sub-band LCMV for larger arrays. Additionally, it is more efficient than SLC for the range being considered, but it may grow more complex for larger arrays. However, an array with more than $2^n$ elements would be very computationally expensive regardless. The only method which is always more efficient than SABC is the sub-banded SLC; however, it has been shown that SABC provides better performance in terms of signal distortion and this happens to be the trade-off that one must accept for SABC.

Accordingly, SABC may utilize a digital array that, unlike SLC, which has auxiliary channels that require an additional antenna element, allows one of the beams of the array to be steered to the angle of arrival of an interference signal for interference cancellation. However, employment of SABC requires that the angle of arrival of the interference signal be known. Thus, SABC employs a direction finding algorithm (e.g., ESPRIT or MUSIC) to provide information on the angle of arrival so that the digital beamformer and interference canceller can steer one of the beams of the main array for interference cancellation.

Figure 8:
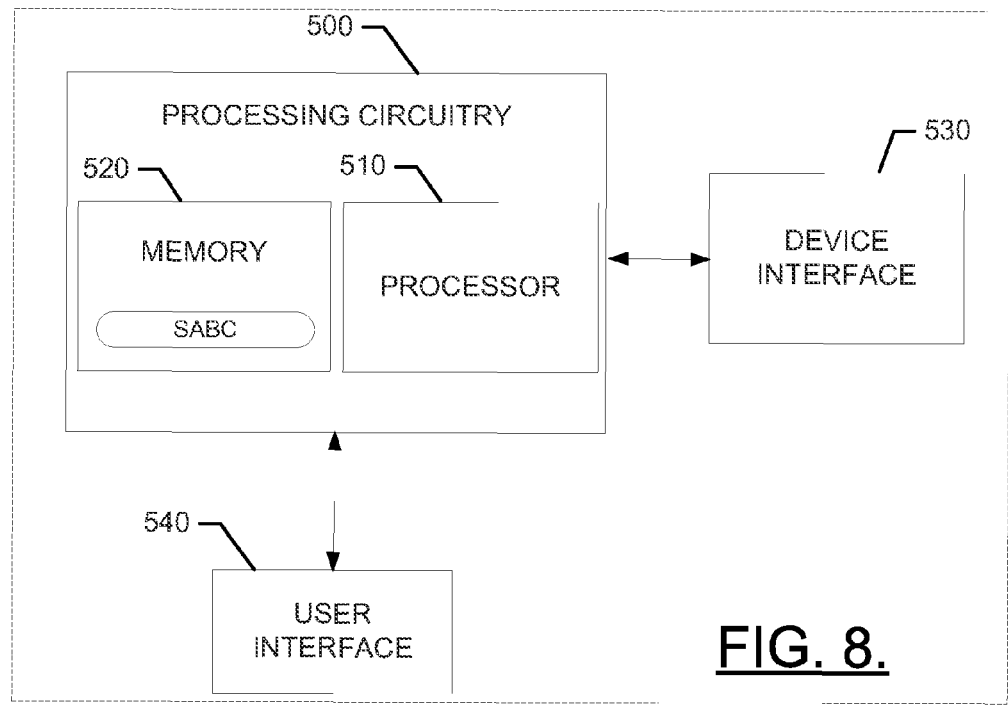
FIG. 8 illustrates a block diagram of an apparatus that may be capable of employing an example embodiment of the SABC algorithm according to an example embodiment.

FIG. 8 illustrates a block diagram of an apparatus (e.g., DSP 240) that may be capable of employing an example embodiment of the SABC algorithm. In this regard, as shown in FIG. 8, the apparatus may include or otherwise be in communication with processing circuitry 500 that is configurable to perform actions in accordance with example embodiments described herein. As such, for example, at least some of the functions attributable to the apparatus may be carried out by or otherwise instructed by the processing circuitry 500. The processing circuitry 500 may therefore provide the hardware for hosting software to configure the system for interference cancellation techniques consistent with example embodiments.

The processing circuitry 500 may be configured to perform data processing, control function execution and/or other processing and management services according to an example embodiment of the present invention. In some embodiments, the processing circuitry 500 may be embodied as a chip or chip set. In other words, the processing circuitry 500 may comprise one or more physical packages chips) including materials, components and/or wires on a structural assembly (e.g., a baseboard).

In an example embodiment, the processing circuitry 500 may include one or more instances of a processor 510 and memory 520 that may be in communication with or otherwise control a device interface 530 and, in some cases, a user interface 540. As such, the processing circuitry 500 may be embodied as a circuit chip (e.g., an integrated circuit chip) configured (e.g., with hardware, software or a combination of hardware and software) to perform operations described herein.

The user interface 540 (if implemented) may be in communication with the processing circuitry 500 to receive an indication of a user input at the user interface 540 and/or to provide an audible, visual, mechanical or other output to the user. As such, the user interface 540 may include, for example, a display, one or more buttons or keys (e.g., function buttons), and/or other input/output mechanisms (e.g., keyboard, microphone, speakers, cursor, joystick, lights and/or the like). The user interface 540 may display information indicating an analysis of data being processed by the apparatus. The data set may be processed and information associated therewith may be presented on a display of the user interface 540 based on instructions executed by the processing circuitry 500 for the analysis of the data according to prescribed methodologies and/or algorithms (e.g., the SABC). Moreover, in some cases, the user interface 540 may include options for selection of one or more reports to be generated based on the analysis of a given data set.

The device interface 530 may include one or more interface mechanisms for enabling communication with other external devices or internal functional components of the apparatus (e.g., antenna elements, mixers, ADCs of the array and/or the like). In some cases, the device interface 530 may be any means such as a device or circuitry embodied in either hardware, or a combination of hardware and software that is configured to receive and/or transmit data from/to devices in communication with the processing circuitry 500.

In an exemplary embodiment, the memory 520 may include one or more non-transitory memory devices such as, for example, volatile and/or non-volatile memory that may be either fixed or removable. The memory 520 may be configured to store information, data, applications, instructions or the like for enabling the apparatus to carry out various functions in accordance with exemplary embodiments of the present invention. For example, the memory 520 could be configured to buffer input data for processing by the processor 510. Additionally or alternatively, the memory 520 could be configured to store instructions for execution by the processor 510. As yet another alternative, the memory 520 may include one or more databases that may store a variety of data sets indicative of processing algorithms and/or the like to be employed. Among the contents of the memory 520, applications may be stored for execution by the processor 510 in order to carry out the functionality associated with each respective application. In some cases, the applications may include directions for control of the apparatus to generate and/or employ the SABC algorithm and any information and/or reports associated with analysis of data as described herein.

The processor 510 may be embodied in a number of different ways. For example, the processor 510 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 510 may be configured to execute instructions stored in the memory 520 or otherwise accessible to the processor 510. As such, whether configured hardware or by a combination of hardware and software, the processor 510 may represent an entity (e.g., physically embodied in circuitry—in the form of processing circuitry 500) capable of performing operations according to embodiments of the present invention while configured accordingly. Thus, for example, when the processor 510 is embodied as an ASIC, FPGA or the like, the processor 510 may be specifically configured hardware for conducting the operations described herein. Alternatively, as another example, when the processor 510 is embodied as an executor of software instructions, the instructions may specifically configure the processor 510 to perform the operations described herein.

In an example embodiment, the processor 510 (or the processing circuitry 500) may be embodied as, include or otherwise control the apparatus. As such, in some embodiments, the processor 510 (or the processing circuitry 500) may be said to cause each of the operations described in connection with the apparatus by directing the apparatus to undertake the corresponding functionalities responsive to execution of instructions or algorithms configuring the processor 510 (or processing circuitry 500) accordingly.

Figure 9:
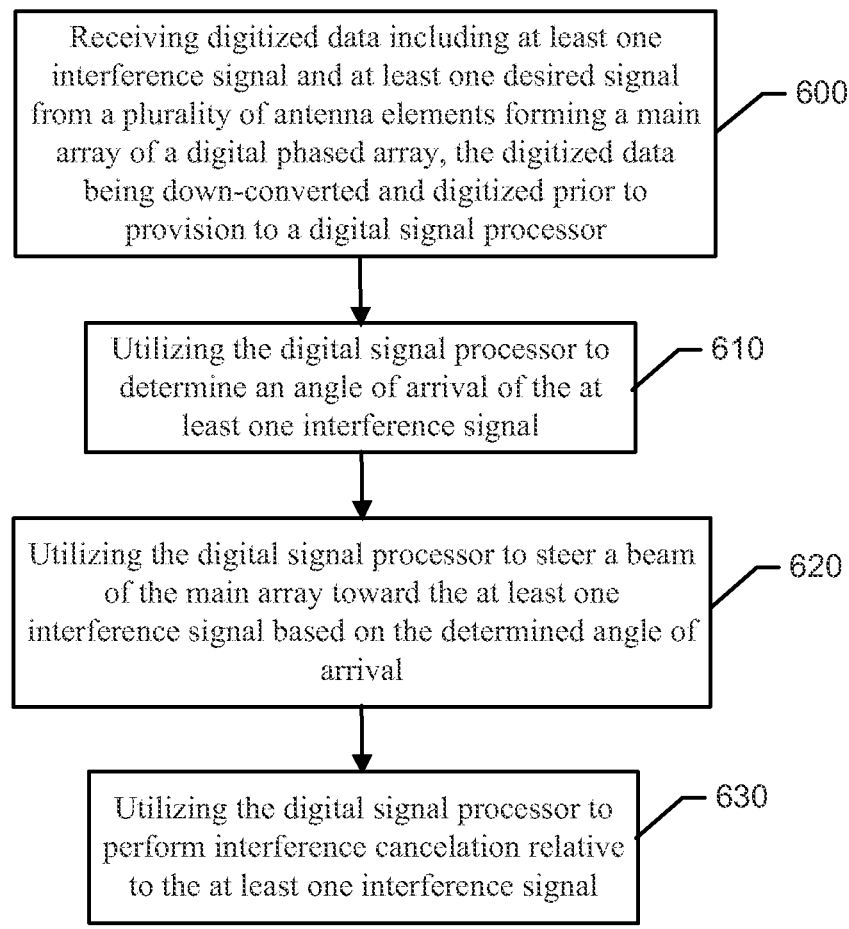
FIG. 9 shows an exemplary block diagram of a method according to an example embodiment.

FIG. 9 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of performing adaptive interference cancellation according to one embodiment of the invention, as shown in FIG. 9, may include receiving digitized data including at least one interference signal and at least one desired signal from a plurality of antenna elements forming a main array of a digital phased array where the digitized data is down-converted and digitized prior to provision to a digital signal processor at operation 600. The method may further include utilizing the digital signal processor to determine an angle of arrival of the at least one interference signal at operation 610, steer a beam of the main array toward the at least one interference signal based on the determined angle of arrival at operation 620, and perform interference cancellation relative to the at least one interference signal at operation 630.

In some embodiments, additional optional operations may be included or the operations described above may be modified or augmented. Each of the additional operations, modification or augmentations may be practiced in combination with the operations above and/or in combination with each other. Thus, some, all or none of the additional operations, modification or augmentations may be utilized in some embodiments. In some cases, determining the angle of arrival may include using ESPRIT to determine the angle of arrival. In an example embodiment, the main array may include elements forming a main channel, and the at least one element of the main array may form an auxiliary channel. In such an example, steering the beam of the main array may include steering the auxiliary channel toward the at least one interference signal. In some embodiments, the method may further include providing the main channel and the auxiliary channel to have the same gain. In an example embodiment, performing interference cancellation may include performing interference cancellation relative to a plurality of interference signals. In some cases, performing interference cancellation may include performing interference cancellation relative to a narrow-band signal or a wide-band signal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A digital phased array comprising:
   a plurality of antenna elements forming a main array of the digital phased array;
   a plurality of mixers configured to down-convert data received at respective ones of the antenna elements;
   a plurality of analog-to-digital converters configured to digitize data provided by corresponding ones of the mixers; and
   a digital signal processor configured to:
   receive digitized data including at least one interference signal and at least one desired signal;
   determine an angle of arrival of the at least one interference signal;
   steer a beam of the main array toward the at least one interference signal based on the determined angle of arrival; and
   perform interference cancellation relative to the at least one interference signal.

2. The digital phased array of claim 1, wherein the digital signal processor is configured to determine the angle of arrival using Estimation of Signal Parameters via Rotational Invariance Techniques (ESPRIT).

3. The digital phased array of claim 1, wherein the main array comprises elements forming a main channel, and wherein at least one element of the main array forms an auxiliary channel.

4. The digital phased array of claim 3, wherein the main channel and the auxiliary channel have the same gain.

5. The digital phased array of claim 3, wherein the auxiliary channel employs steerable beams.

6. The digital phased array of claim 1, wherein the digital signal processor is configured to perform interference cancellation relative to a plurality of interference signals.

7. The digital phased array of claim 1, wherein the digital signal processor is configured to perform interference cancellation relative to a narrow-band signal.

8. The digital phased array of claim 1, wherein the digital signal processor is configured to perform interference cancellation relative to a wide-band signal.

9. A method comprising:
   receiving digitized data including at least one interference signal and at least one desired signal from a plurality of antenna elements forming a main array of a digital phased array, the digitized data being down-converted and digitized prior to provision to a digital signal processor;
   utilizing the digital signal processor to determine an angle of arrival of the at least one interference signal;
   utilizing the digital signal processor to steer a beam of the main array toward the at least one interference signal based on the determined angle of arrival; and
   utilizing the digital signal processor to perform interference cancellation relative to the least one interference signal.

10. The method of claim 9, wherein determining the angle of arrival comprises using Estimation of Signal Parameters via Rotational Invariance Techniques (ESPRIT) to determine the angle of arrival.

11. The method of claim 9, wherein the main array comprises elements forming a main channel, wherein at least one element of the main array forms an auxiliary channel, and wherein steering the beam of the main array comprises steering the auxiliary channel toward the at least one interference signal.

12. The method of claim 11, further comprising providing the main channel and the auxiliary channel to have the same gain.

13. The method of claim 9, wherein performing interference cancellation comprises performing interference cancellation relative to a plurality of interference signals.

14. The method of claim 9, wherein performing interference cancellation comprises performing interference cancellation relative to a narrow-band signal.

15. The method of claim 9, wherein performing interference cancellation comprises performing interference cancellation relative to a wide-band signal.

16. A computer program product comprising a computer-readable storage medium having computer-executable program code instructions stored therein, the computer-executable program code instructions comprising program code instructions for:
   receiving digitized data including at least one interference signal and at least one desired signal from a plurality of antenna elements forming a main array of a digital phased array, the digitized data being down-converted and digitized prior to provision to a digital signal processor;
   utilizing the digital signal processor to determine an angle of arrival of the at least one interference signal;
   utilizing the digital signal processor to steer a beam of the main array toward the at least one interference signal based on the determined angle of arrival; and
   utilizing the digital signal processor to perform interference cancellation relative to the at least one interference signal.

17. The computer program product of claim 16, wherein program code instructions for determining determine the angle of arrival include instructions for using Estimation of Signal Parameters via Rotational Invariance Techniques (ESPRIT) to determine the angle of arrival.

18. The computer program product of claim 16, wherein program code instructions for performing interference cancellation include instructions for performing interference cancellation relative to a plurality of interference signals.

19. The computer program product of claim 16, wherein program code instructions for performing interference cancellation include instructions for performing interference cancellation relative to a narrow-band signal.

20. The computer program product of claim 16, wherein program code instructions for performing interference cancellation include instructions for performing interference cancellation relative to a wide-band signal.

* * * * *